United States Patent
Xie

(10) Patent No.: US 10,012,006 B2
(45) Date of Patent: *Jul. 3, 2018

(54) TENT HAVING RETRACTABLE ROOF

(71) Applicant: YOTRIO GROUP CO., LTD., Linhai (CN)

(72) Inventor: Jianping Xie, Linhai (CN)

(73) Assignee: Yotrio Group Co., Ltd., Linhai, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,601

(22) Filed: Sep. 22, 2016

(65) Prior Publication Data
US 2017/0009483 A1   Jan. 12, 2017

Related U.S. Application Data

(63) Continuation of application No. 14/637,232, filed on Mar. 3, 2015, now Pat. No. 9,605,442, which is a continuation of application No. 14/185,057, filed on Feb. 20, 2014, now Pat. No. 9,038,648.

(30) Foreign Application Priority Data

Dec. 4, 2013  (CN) .................. 2013 3 05988911

(51) Int. Cl.
| | |
|---|---|
| *E04H 15/46* | (2006.01) |
| *E04H 15/60* | (2006.01) |
| *E04H 15/54* | (2006.01) |
| *F16B 7/10* | (2006.01) |
| *E04H 15/58* | (2006.01) |
| *E04H 15/34* | (2006.01) |
| *F16B 7/18* | (2006.01) |

(52) U.S. Cl.
CPC ............. *E04H 15/46* (2013.01); *E04H 15/34* (2013.01); *E04H 15/54* (2013.01); *E04H 15/58* (2013.01); *E04H 15/60* (2013.01); *F16B 7/10* (2013.01); *F16B 7/182* (2013.01)

(58) Field of Classification Search
CPC ......... E04H 15/32; E04H 15/34; E04H 15/60; E04H 15/46; E04H 15/58; E04H 15/44; E04H 2015/326; F16B 7/10; F16B 7/182; F16B 7/149; Y10T 403/32467
USPC ..... 135/121, 123, 114, 117, 120.3, 141–142, 135/119; 403/286, 292, 293, 315–317, 403/109.1, 109.5, 377; 160/46, 62, 240; 248/188.5
See application file for complete search history.

(56) References Cited

U.S. PATENT DOCUMENTS

| | | | | |
|---|---|---|---|---|
| 3,070,107 | A | * | 12/1962 | Beatty ................... E04H 15/003 135/120.3 |
| 3,441,037 | A | * | 4/1969 | Transeau ............... E04H 15/003 135/116 |
| 4,066,089 | A | * | 1/1978 | Rainwater ............... E04H 15/48 135/114 |

(Continued)

*Primary Examiner* — Winnie Yip
(74) *Attorney, Agent, or Firm* — Jingming (James) Cai; SAC Attorneys LLP

(57) ABSTRACT

The present invention provides a tent having a retractable roof. A plurality of poles extend substantially perpendicular to the ground. A roof frame is fastened to the plurality of poles and a tarpaulin is attached on the roof frame. At least one of the plurality of poles is divided into an upper pole and a lower pole, and a connection mechanism detachably connects the upper pole and the lower pole.

16 Claims, 8 Drawing Sheets

(56) References Cited

U.S. PATENT DOCUMENTS

| | | | | |
|---|---|---|---|---|
| 5,595,204 A * | 1/1997 | Hwang | ............... | E04H 15/48 |
| | | | | 135/142 |
| 5,794,679 A * | 8/1998 | Williams | ............ | E04F 10/02 |
| | | | | 160/46 |
| 5,809,701 A * | 9/1998 | Vollebregt | ......... | A01G 9/1476 |
| | | | | 160/84.06 |
| 5,823,578 A * | 10/1998 | Chiou | ............. | F16L 27/12 |
| | | | | 285/298 |
| 7,748,429 B2 * | 7/2010 | Caire | ............ | E04F 10/0607 |
| | | | | 160/113 |
| 8,402,981 B2 * | 3/2013 | Liu | ............ | A45B 17/00 |
| | | | | 135/15.1 |
| 8,468,775 B2 * | 6/2013 | Vaughn | .......... | E02D 27/34 |
| | | | | 403/200 |
| 8,578,681 B2 * | 11/2013 | Patterson | ......... | E02B 17/027 |
| | | | | 403/292 |
| 2002/0148188 A1 * | 10/2002 | Rizzotto | ........ | E04B 1/24 |
| | | | | 52/653.1 |
| 2007/0017646 A1 * | 1/2007 | Zhao | ............ | E04F 10/0607 |
| | | | | 160/239 |
| 2008/0178551 A1 * | 7/2008 | Porter | ........... | E04B 1/24 |
| | | | | 52/653.1 |
| 2009/0031641 A1 * | 2/2009 | Grazioso | ......... | E04F 10/02 |
| | | | | 52/74 |
| 2010/0252207 A1 * | 10/2010 | Westgarth | ........ | E04F 10/02 |
| | | | | 160/45 |

* cited by examiner

TENT HAVING RETRACTABLE ROOF

CROSS-REFERENCE TO RELATED APPLICATIONS

This application is a continuation application of non-provisional patent application Ser. No. 14/637,232, titled "TENT HAVING RETRACTABLE ROOF", filed on Mar. 3, 2015 in the United States Patent and Trademark Office, which is a continuation application of non-provisional patent application Ser. No. 14/185,057, now U.S. Pat. No. 9,038,648B1, titled "TENT HAVING RETRACTABLE ROOF", filed on Feb. 20, 2014 in the United States Patent and Trademark Office, which claims the priority of Chinese Patent Application No. 2013305988911, filed on Dec. 4, 2013 before the Chinese State Intellectual Property Office.

The specifications of the above referenced applications are incorporated herein by reference in their entirety.

TECHNICAL FIELD

The present invention relates to a tent, and more particularly, a tent having a retractable roof.

BACKGROUND

Tents have been widely used in nowadays, and as outdoor tents, tents having a retractable roof have been developed increasingly. But a conventional tent having a retractable roof has long non-foldable poles, which makes the package of the tent is big in size and thus is inconvenient to be transported.

SUMMARY

Accordingly, an objective of the present invention is to at least partially overcome the shortcomings of the prior art and to provide a tent having a retractable roof that can be easily folded so as to decrease the size of the package, thereby facilitating transportation of the tent.

To achieve at least some of the objectives, the present invention provides a tent having a retractable roof, comprising a plurality of poles extending substantially perpendicular to the ground, a roof frame fastened to the plurality of poles and a tarpaulin attached on the roof frame. At least one of the plurality of poles comprises an upper pole and a lower pole, and the tent further comprises a connection mechanism detachably connecting the upper pole and the lower pole.

Preferably, the connection mechanism comprises a connection plate, a plurality of bolts and a plurality of second through holes disposed on a lower end of the upper pole, a lower end of the connection plate is received in and fastened to an upper end of the lower pole, an upper end of the connection plate is received in the lower end of the upper pole, the connection plate has a plurality of first through holes, the plurality of bolts are inserted into the second through holes and the corresponding first through holes respectively so that the connection plate and the upper pole are fixedly connected.

Preferably, the upper pole and the lower pole are formed in a shape of a hollow rectangular tube, and the connection plate is formed in a shape of a beam channel. The connection plate has a wall with a thickness being greater than a thickness of walls of the upper pole and a thickness of walls of the lower pole.

Preferably, a sleeve is further disposed on the lower end of the upper pole, and the sleeve is formed in a shape of a tube adapted to slide along the upper pole. An inner diameter of an upper part of the sleeve is substantially the same as an outer diameter of the upper pole, and an inner diameter of a lower end of the sleeve is greater than an outer diameter of the upper pole.

Preferably, a collar is further fixedly disposed on the upper end of the lower pole, the sleeve comprises a concave portion recessed inward at a lower end of an inner wall of the sleeve, the collar comprises a convex portion adapted to engage with the concave portion of the sleeve on an outer wall of the collar.

Preferably, the collar further comprises a retainer ring on an inner wall of the collar, the retainer ring is protruded toward the center axis of the collar, a bottom surface of the retainer ring abuts a top surface of the lower pole, and a top surface of the retainer ring contacts and supports a bottom surface of the upper pole. Both of the sleeve and the collar are made of rubber or plastic material.

Preferably, the lower end of the connection plate is fastened to the upper end of the lower pole through welding. The connection plate is made of metal.

Alternatively, the connection mechanism comprises a plurality of first connection holes disposed on a lower end of the upper pole, a plurality of second connection holes disposed on an upper end of the lower pole and a plurality of bolts which are inserted into the first connection holes and the corresponding second connection holes respectively so that the upper pole and the lower pole are fixedly connected.

Preferably, the roof frame comprises a front supporting rod, a rear supporting rod and a plurality of guiding rods, the number of the plurality of poles is four and each of the plurality of poles comprises an upper pole and a lower pole. The front supporting rod and the rear supporting rod are disposed to be extended along a first direction which is substantially parallel to the ground, both ends of the front supporting rod and both ends of the rear supporting rod are fixed to upper ends of the upper poles respectively, the plurality of guiding rods are disposed to be extended along a second direction which is substantially parallel to the ground and perpendicular to the first direction.

Preferably, the number of the plurality of guiding rods is three, both ends of the outmost two guiding rods are fastened to the upper ends of the upper poles respectively, and both ends of the middle guiding rod is fastened to the front supporting rod and the rear supporting rod respectively. The middle guiding rod has the same interval to each of the outmost two guiding rods.

Preferably, the roof frame further comprises a plurality of reinforcement rods extended along the second direction. The number of the plurality of reinforcement rods is two, each of the two reinforcement rods is disposed between adjacent guiding rods, with a same interval to the adjacent guiding rods.

Preferably, the roof frame further comprises a plurality of sliding rods on which the tarpaulin is attached, wherein the plurality of sliding rods are disposed to be extended along the first direction. A plurality of sliding blocks may be further disposed on the plurality of sliding rods, and the guiding rods may have a plurality of sliding grooves extended in the second direction, the plurality of sliding blocks may be slidably received in the plurality of sliding grooves.

Preferably, a plurality of feet attached on lower ends of the plurality of poles is further provided.

According to the present invention, since at least one of the poles has two parts and a connection mechanism is provided between the two parts, the pole can be folded and thus the package is relatively small in size compared with the conventional tents having a retractable roof. Therefore, the tents according to the present invention are convenient to be transported.

In addition, a sleeve and a collar may be further provided, so that the connection mechanism may be hidden in the sleeve, which makes the poles have a beautiful appearance.

Further and other features of the invention will be apparent to those skilled in the art from the following detailed description of the embodiments thereof.

BRIEF DESCRIPTION OF DRAWINGS

Reference may now be made to the following detailed description taken together with the accompanying drawings in which.

DETAILED DESCRIPTION

Figure 1:
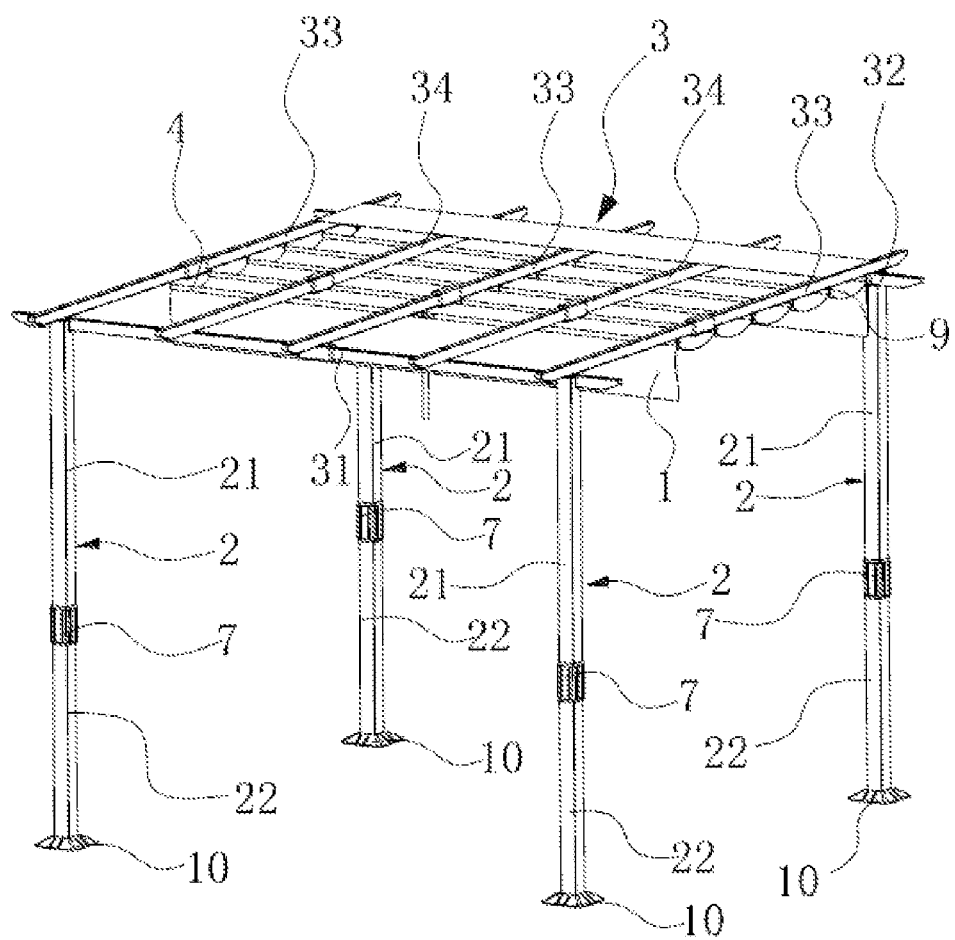
FIG. 1 is a schematic perspective view illustrating a tent according to a first embodiment of the present invention.

Various embodiments of the present invention will be described hereinafter. The following description provides specific details for a thorough understanding and enabling description of these embodiments. Those skilled in the art will understand, however, that the present invention may be practiced without many of these details. Likewise, those skilled in the art will also understand that the present invention can include many other obvious features not described in detail herein. Additionally, some well-known structures or functions may not be shown or described in detail below, so as to avoid unnecessarily obscuring the relevant description.

This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer. The detail structures will be described to provide a thorough understanding of the present invention. Apparently, the implementation of the present invention is not limited by the specific details well known by those skilled in the art. A preferred embodiment will be described as follows; however, there are many other embodiments.

The terminology used below is to be interpreted in its broadest reasonable manner, even though it is being used in conjunction with a detailed description of certain embodiments of the present invention. Indeed, certain terms may even be emphasized below; however, any terminology intended to be interpreted in any restricted manner will be overly and specifically defined as such in this Detailed Description section.

FIG. 1 is a schematic perspective view illustrating a tent according to a first embodiment of the present invention. Referring to FIG. 1, a tent according to the first embodiment of the present invention includes a plurality of poles 2 extending substantially perpendicular to the ground, a roof frame 3 fastened to the upper ends of the poles 2 and a tarpaulin 1 attached on the roof frame 3. In this embodiment, the number of the poles 2 is four, but the prevent invention is not limited thereto. In addition, a plurality of feet 10 attached on lower ends of the poles 2 may be further provided to increase contact area with the ground.

At least one of the poles 2 includes an upper pole 21 and a lower pole 22. Preferably, each of the poles 2 includes an upper pole 21 and a lower pole 22. The lower pole 22 is supported on the ground, for example, via the foot 10.

The roof frame 3 includes a front supporting rod 31, a rear supporting rod 32 and a plurality of guiding rods 33. In this embodiment, the number of the guiding rods 33 is three, but the present invention is not limited thereto. The front supporting rod 31 and the rear supporting rod 32 are disposed to be extended along a first direction which is substantially parallel to the ground, i.e., perpendicular to the direction in which the poles 2 are extended. Both ends of the front supporting rod 31 and both ends of the rear supporting rod 32 are fixed to the upper ends of the four upper poles 21, respectively. The guiding rods 33 are disposed to be extended along a second direction which is substantially parallel to the ground and perpendicular to the first direction. Both ends of the outmost two guiding rods 33 are fastened to the upper ends of the upper poles 21 respectively, and both ends of the middle guiding rod 33 is fastened to the front supporting rod 31 and the rear supporting rod 32 respectively. Preferably, the middle guiding rod 33 has the same interval to each of the outmost two guiding rods 33.

The roof frame 3 may further include a plurality of reinforcement rods 34 extended along the second direction. The number of the reinforcement rods 34 may be two and each of the two reinforcement rods 34 may be disposed between adjacent guiding rods 33, preferably with the same interval to the adjacent guiding rods 33.

Figure 7:
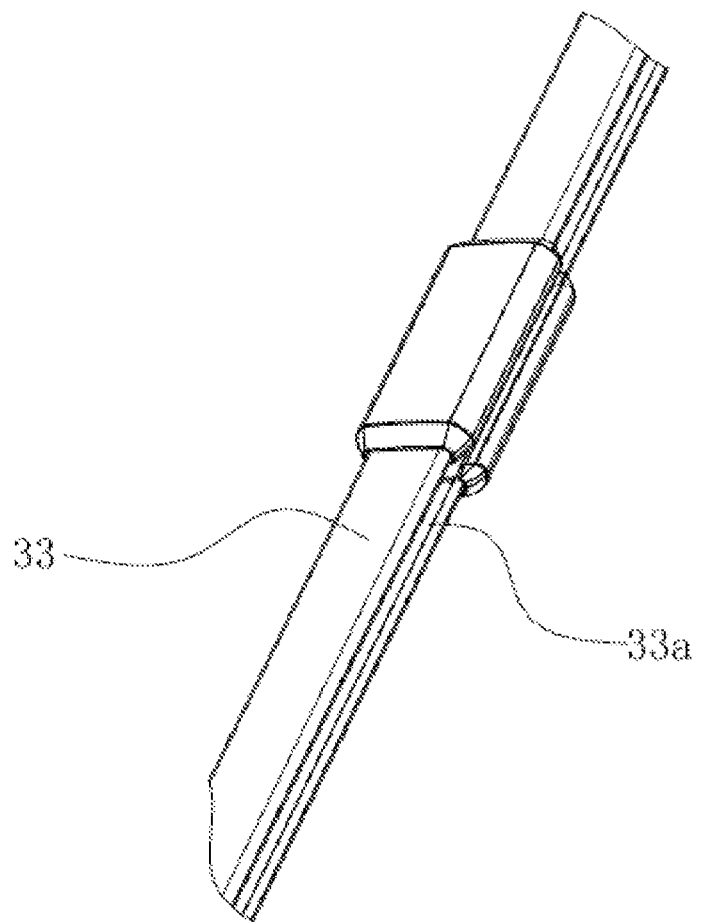
FIG. 7 is a schematic partial perspective view illustrating a guiding rod of the tent according to the first embodiment of the present invention.

The roof frame 3 may further include a plurality of sliding rods 4 on which the tarpaulin 1 is attached. The plurality of sliding rods 4 are disposed to be extended along the first direction. The guiding rods 33 have a plurality of sliding grooves 33a (referring to FIG. 7) extended in the second direction, the plurality of sliding blocks 9 are slidably received in the plurality of sliding grooves 33a so that the sliding rods 4 is adapted to slide along the guiding rods 33.

When lighting is needed, all of the sliding rods 4 can be slid to be together, thus the tarpaulin 1 is shrunk, so that the roof frame 3 is opened and light can go into the tent. If an edge of the tarpaulin 1 is dragged to expand the tarpaulin 1, the sliding rods 4 can be slid along the guiding rods 33 and can be stopped at any position, so that the area shaded by the tarpaulin 1 can be adjusted. When the tarpaulin 1 is fully expanded, the inside space of the tent is fully shaded.

Figure 2:
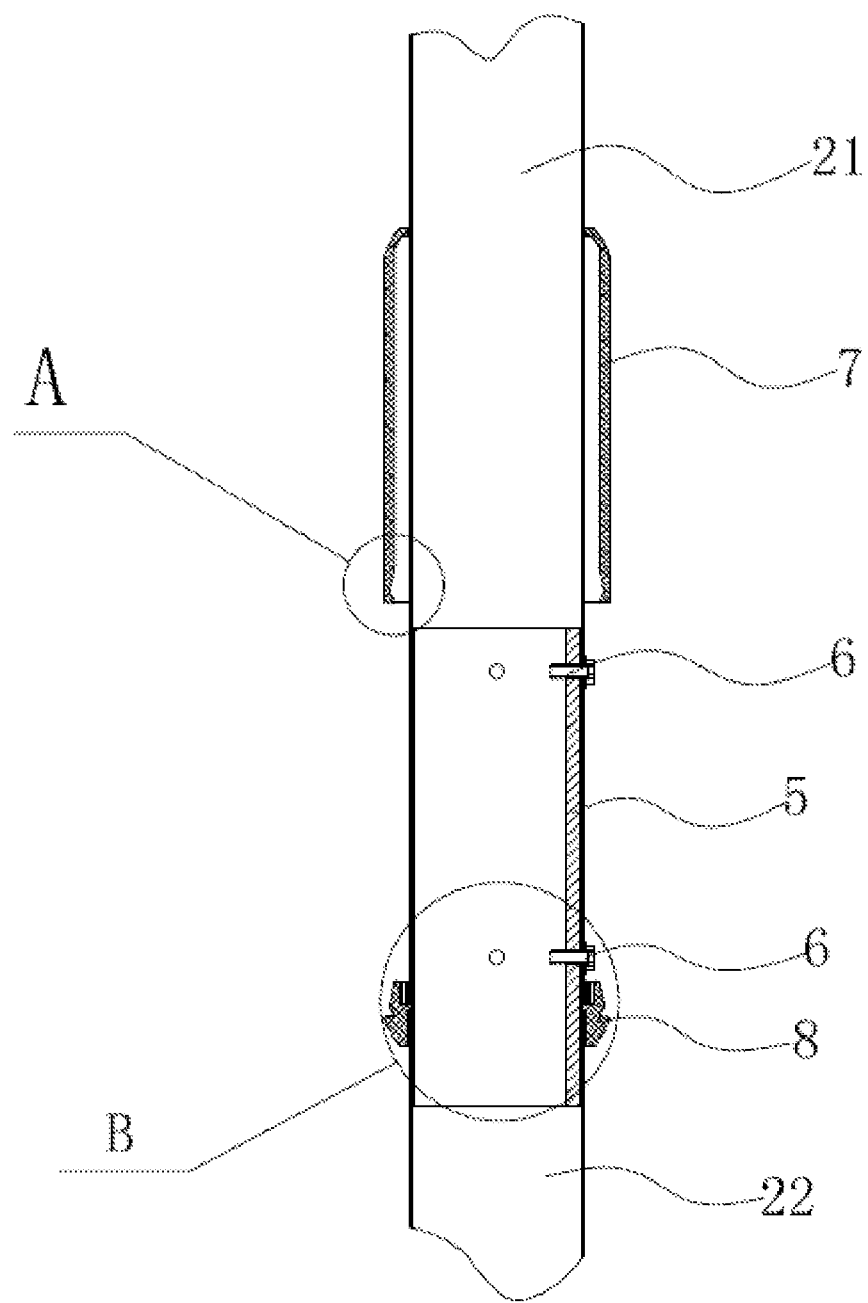
FIG. 2 is a schematic partial cross-sectional view illustrating a pole of the tent according to the first embodiment of the present invention.
Figure 5:
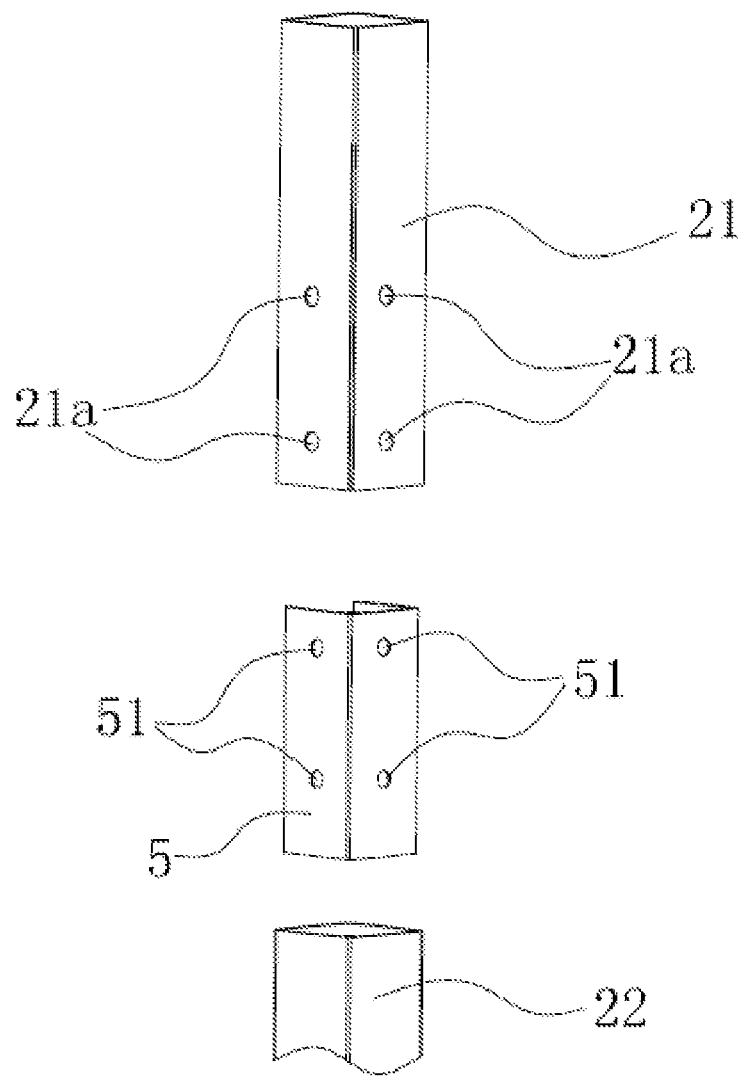
FIG. 5 is a schematic partial perspective view illustrating a pole and a connection plate of the tent according to the first embodiment of the present invention.
Figure 6:
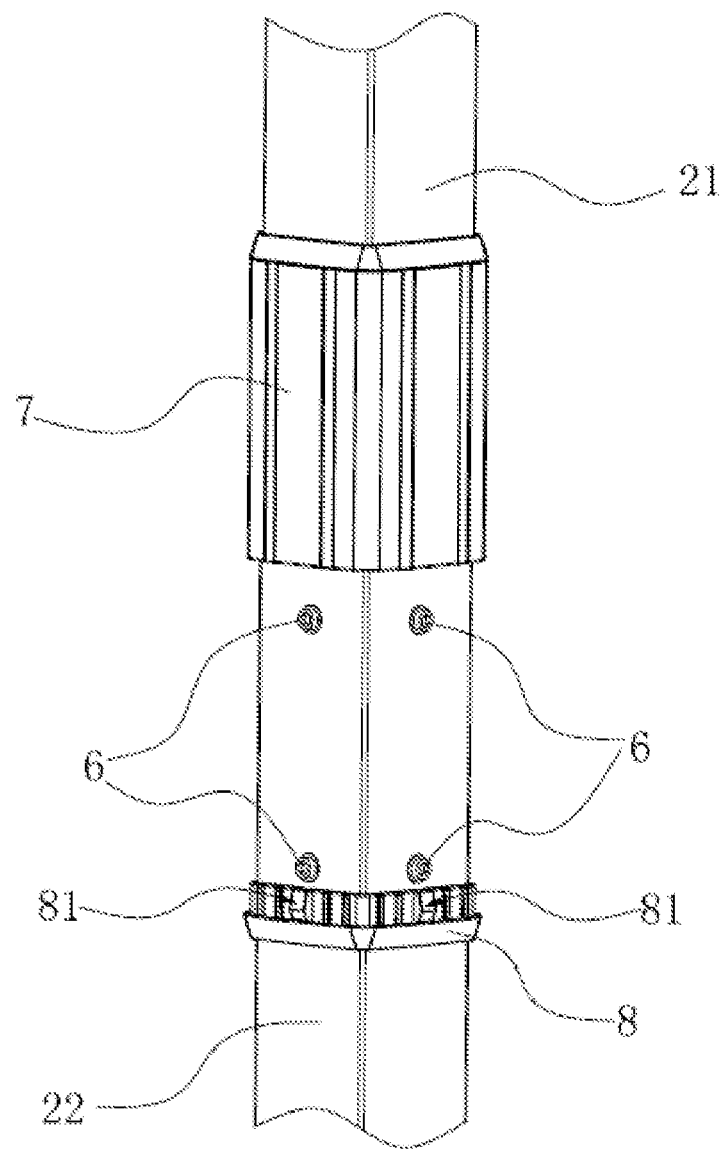
FIG. 6 is a schematic perspective view illustrating a collar and a sleeve of the tent according to the first embodiment of the present invention.

FIG. 2 is a schematic partial cross-sectional view illustrating a pole of the tent according to the first embodiment of the present invention. FIG. 5 is a schematic partial perspective view illustrating a pole and a connection plate of the tent according to the first embodiment of the present invention. FIG. 6 is a schematic perspective view illustrating a collar and a sleeve of the tent according to the first embodiment of the present invention. Referring to FIGS. 1, 2, 5 and 6, the upper ends of the upper poles 21 are fastened to the roof frame 3. For example, the upper ends of the upper holes 21 are fastened to the intersection points of the front supporting rods 31 and the guiding rods 33 and the intersection points of the rear supporting rods 32 and the guiding rods 33 respectively, but the present invention is not limited thereto.

Hereinafter, one upper pole 21 and one corresponding lower pole 22 are taken as example. In this embodiment, the upper pole 21 and the lower pole 22 are formed in a shape of a hollow rectangular tube. The tent according to the first embodiment further includes a connection mechanism comprising a connection plate 5, a plurality of bolts 6 and a plurality of second through holes 21a disposed on lower end of the upper pole 21. The connection plate 5 formed in a shape of a beam channel is disposed between the upper pole 21 and the lower pole 22. The connection plate 5 extended vertically is disposed inside the upper pole 21 and the lower pole 22. In detail, a lower end of the connection plate 5 is received in and fastened to, for example, through welding, an upper end of the lower pole 22. An upper end of the connection plate 5 is received in a lower end of the upper pole 21. The connection plate 5 has a plurality of first through holes 51 with the same number as the second through holes 21a. The plurality of bolts 6 are inserted into the second through holes 21a and the corresponding first through holes 51 respectively, so that the connection plate 5 and the upper pole 21 are fixedly connected.

The connection plate 5 may be formed of metal and thus has a good strength, and may have a wall with a thickness being greater than a thickness of walls of the upper poles 21 and a thickness of walls of the lower poles 22. Since the connection plate 5 is disposed between the upper pole 21 and the lower pole 22, the robustness of the connection of the upper pole 21 and the lower pole 22 can be improved.

Figure 3:
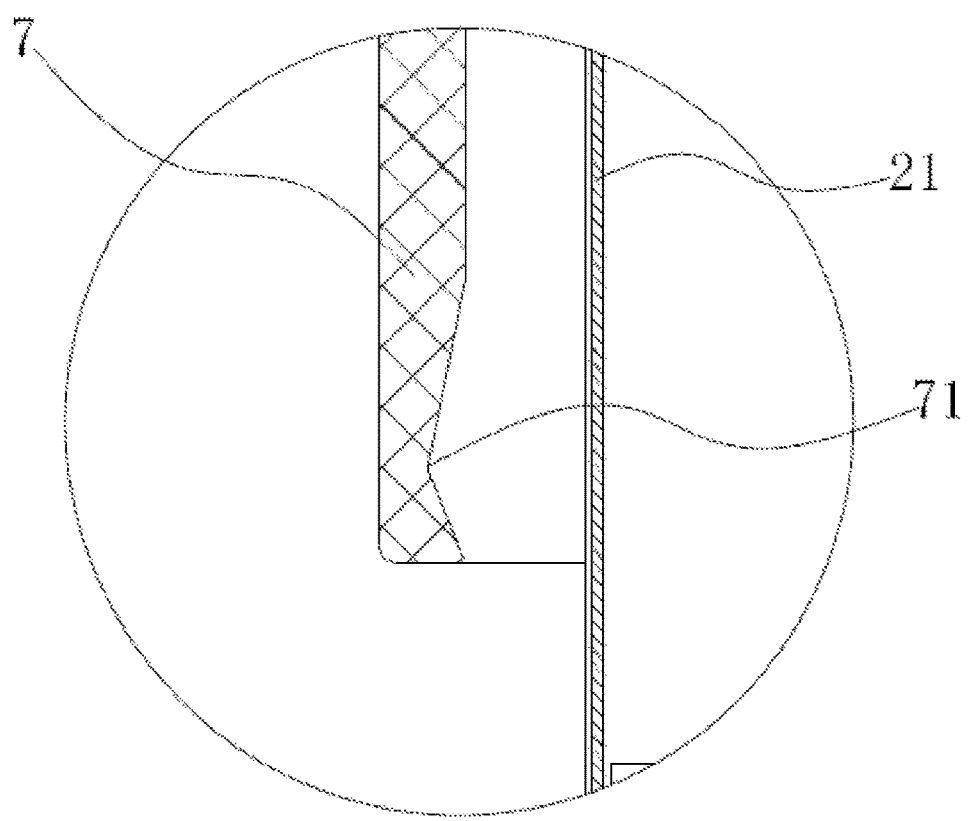
FIG. 3 is an enlarged view of Part A shown in FIG. 2.
Figure 4:
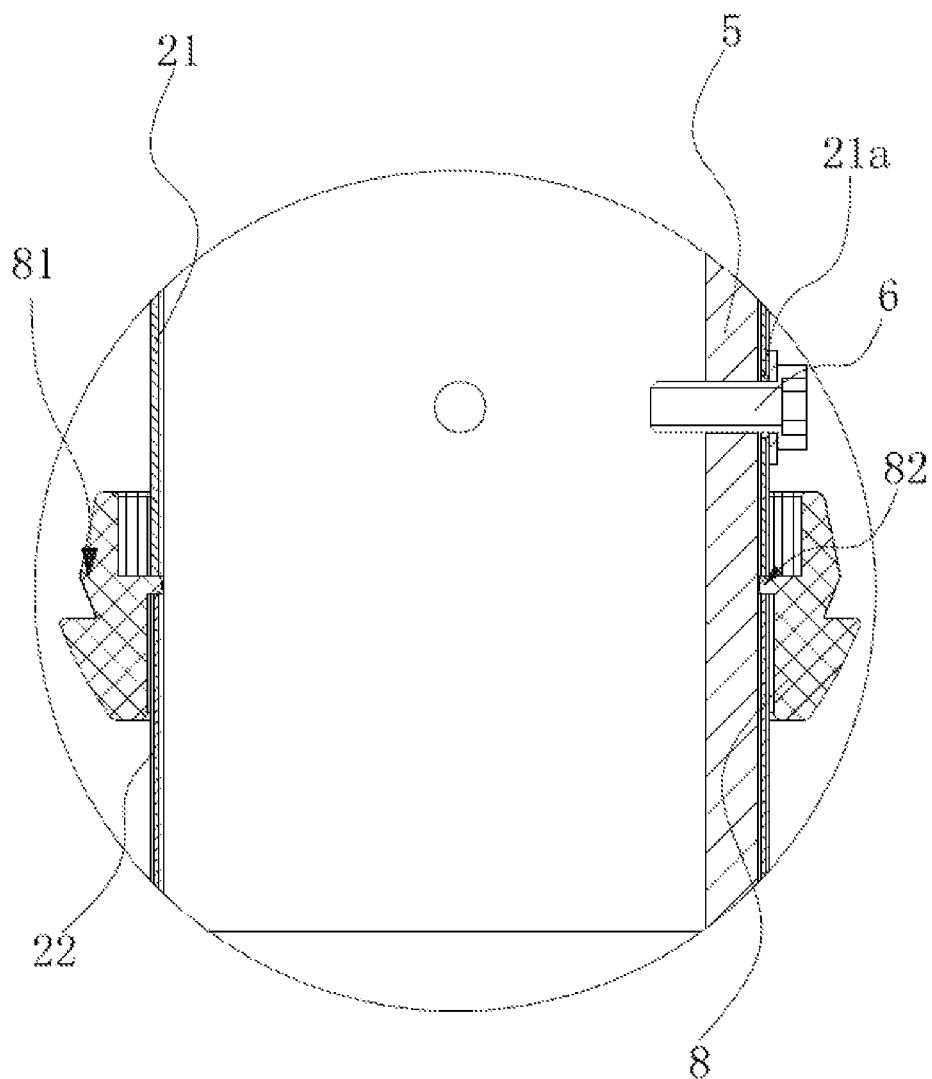
FIG. 4 is an enlarged view of Part B shown in FIG. 2.

FIG. 3 is an enlarged view of Part A shown in FIG. 2. FIG. 4 is an enlarged view of Part B shown in FIG. 2. Referring to FIGS. 2, 3, 4 and 6, a sleeve 7 for covering the bolts 6 is disposed on the lower end of the upper pole 21. The sleeve 7 is formed in a shape of a tube adapted to slide along the upper pole 21. An inner diameter of an upper part of the sleeve 7 is substantially the same as an outer diameter of the upper pole 21 so that the sleeve 7 is radially supported by the upper pole 21, and an inner diameter of a lower end of the sleeve 7 is greater than an outer diameter of the upper pole 21 so that a gap is formed there between. The sleeve 7 includes a concave portion 71 recessed inward at a lower end of an inner wall of the sleeve 7.

A collar 8 is fixedly disposed on the upper end of the lower pole 22. The collar 8 includes a convex portion 81 which is adapted to engage with the concave portion 71 of the sleeve 7 on an outer wall of the collar 8. In operation, the sleeve 7 can be slid in the first direction, and be stopped when the concave portion 71 of the sleeve 7 engages with the convex portion 81 of the collar 8.

The collar 8 may further include a retainer ring 82 on an inner wall of the collar 8. The retainer ring 82 is protruded toward the center axis of the collar 8. A bottom surface of the retainer ring 82 abuts a top surface of the lower pole 22, and a top surface of the retainer ring 82 contacts and supports a bottom surface of the upper pole 21. Both of the sleeve 7 and the collar 8 may be made of rubber or plastic material.

In addition, since there is a gap between the lower end of the inner wall of the sleeve 7 and the outer wall of the upper pole 21, the sliding of the sleeve 7 is not interfered by the heads of the bolts 6. Such design enables the bolts 6 be hidden inside the sleeve 7 and makes the pole 2 have a beautiful appearance.

In order to assemble the upper pole 21 and the lower pole 22, the sleeve 7 is firstly mounted on the upper pole 21, then the collar 8 is mounted to the connection plate 5 so that the bottom surface of the retainer ring 82 abuts the top surface of the lower pole 22 and the positions of the second through holes 21a of the upper pole 21 correspond to those of the first through holes 51. Next, the bolts 6 are inserted into the second through holes 21a and the first through holes 51 respectively to fixedly connect the connection plate 5 and the upper pole 21. At this point, the connection of the upper pole 21 and the lower pole 22 is completed.

In an embodiment of the present invention, after the connection of the upper pole 21 and the lower pole 22 is completed, the sleeve 7 is further moved downward so that the concave portion 71 of the sleeve 7 engages with the convex portion 81 of the collar 8. At this point, the sleeve 7 is fixed and the bolts 6 are hidden inside the sleeve 7.

Figure 8:
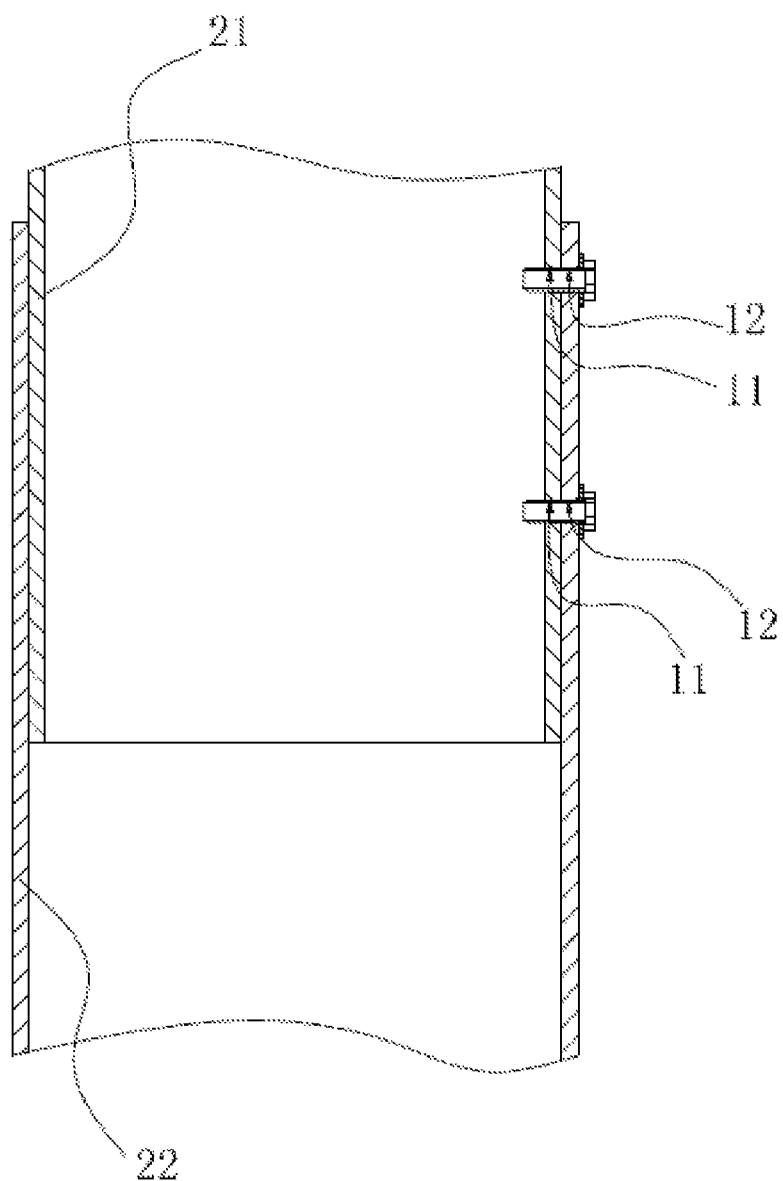
FIG. 8 is a schematic partial cross-sectional view illustrating a pole of the tent according to a second embodiment of the present invention.

FIG. 8 is a schematic partial cross-sectional view illustrating a pole of the tent according to a second embodiment of the present invention. The second embodiment is similar to the first embodiment and only different parts will be described hereinafter.

Referring to FIG. 8, unlike the connection plate 5 according to the first embodiment, the connection mechanism according to the second embodiment includes a plurality of first connection holes 11, a plurality of second connection holes 12 and a plurality of bolts. In detail, the first connection holes 11 are disposed on a lower end of the upper pole 21 and the second connection holes 12 are disposed on an upper end of the lower pole 22. And the positions of the first connection holes 11 correspond to those of the second connection holes 12. The plurality of bolts are inserted into the first connection holes 11 and the corresponding second connection holes 12 respectively, so that the upper pole 21 and the lower pole 22 are fixedly connected.

The connection manner of the front supporting rod 31, the rear supporting rod 32, the guiding rods 33 and the reinforcement rods 34 may be similar as that of the poles 2. That is, each of the front supporting rod 31, the rear supporting rod 32, the guiding rods 33 and the reinforcement rods 34 may include two parts which may be connected by a connection mechanism according to the first embodiment or the second embodiment. The repeated description thereof will be omitted herein.

Those skilled in the art can understand that even though there are a lot of terms, such as tarpaulin 1, pole 2, upper pole 21, second through holes 21a, lower pole 22, a roof frame 3, front supporting rod 31, rear supporting rod 32, guiding rod 33, sliding grooves 33a, reinforcement rods 34, sliding rods 4, connection plate 5, first through holes 51, bolt 6, sleeve 7, concave portion 71, collar 8, convex portion 81, retainer ring 82, sliding block 9, feet 10 etc., other terms may also be used, and those terms are only used to describe and explain the nature of the invention, and should be used to limit the scope of the present invention.

It should be understood that the above description just displays preferred embodiments of the present invention and is in no way intended to limit the scope of the present invention. Any modifications, equivalents, improvements and the like made within the spirit and principle of the present invention should be encompassed in the scope of the present invention.

What is claimed is:

1. A tent having a retractable roof, comprising:
   a plurality of poles extending substantially perpendicular to the ground, wherein at least one of the plurality of poles comprises an upper pole and a lower pole;
   a roof frame fastened to the plurality of poles and a tarpaulin attached on the roof frame;
   a connection mechanism comprising a connection plate, wherein a lower end of the connection plate is fastened to an upper end of the lower pole by welding, wherein a plurality of first through holes are disposed at a lower end of the upper pole, wherein a plurality of second through holes are disposed at a top end of the connection plate corresponding to the first through holes disposed at the lower end of the upper pole, and wherein a plurality of bolts inserted into the first through holes and corresponding second through holes detachably connect the upper pole and the lower pole; and
   a sleeve disposed on a lower end of the upper pole, wherein the sleeve is formed in a shape of a tube adapted to slide along the upper pole and the connection mechanism to lock with the connection mechanism, and wherein the sleeve is adapted to fully cover the plurality of bolts.

2. The tent of claim 1, wherein the upper pole and the lower pole are formed in a shape of a hollow rectangular tube, and wherein the connection plate is formed in a shape of a beam channel.

3. The tent of claim 2, wherein the connection plate has a wall with a thickness being greater than a thickness of walls of the upper pole and a thickness of walls of the lower pole.

4. The tent of claim 2, wherein the connection plate is made of metal.

5. The tent of claim 1, wherein the sleeve comprises a concave portion recessed inward at a lower end of an inner wall of the sleeve, wherein an inner diameter of an upper part of the sleeve is substantially the same as an outer diameter of the upper pole, and wherein an inner diameter of a lower end of the sleeve is greater than an outer diameter of the upper pole.

6. The tent of claim 5, further comprising a collar mounted on the connection plate, wherein the collar comprises a convex portion on an outer wall of the collar adapted to engage with the concave portion of the sleeve, wherein the collar further comprises a retainer ring on an inner wall of the collar, wherein the retainer ring is protruded toward the center axis of the collar, wherein a bottom surface of the retainer ring abuts a top surface of the lower pole, and wherein a top surface of the retainer ring contacts and supports a bottom surface of the upper pole.

7. The tent of claim 6, wherein both the sleeve and the collar are made of rubber or plastic material.

8. The tent of claim 1, wherein the roof frame comprises a front supporting rod, a rear supporting rod and a plurality of guiding rods, wherein number of the plurality of poles is four and each of the plurality of poles comprises an upper pole and a lower pole, wherein the front supporting rod and the rear supporting rod are disposed to be extended along a first direction which is substantially parallel to the ground, wherein both ends of the front supporting rod and both ends of the rear supporting rod are fixed to upper ends of the upper poles respectively, and wherein the plurality of guiding rods are disposed to be extended along a second direction which is substantially parallel to the ground and perpendicular to the first direction.

9. The tent of claim 8, wherein number of the plurality of guiding rods is three, wherein the three guiding rods comprise outmost two guiding rods and a middle guiding rod, wherein both ends of the outmost two guiding rods are fastened to the upper ends of the upper poles respectively, and wherein both ends of the middle guiding rod is fastened to the front supporting rod and the rear supporting rod respectively.

10. The tent of claim 9, wherein the middle guiding rod has same interval to each of the outmost two guiding rods.

11. The tent of claim 8, wherein the roof frame further comprises a plurality of reinforcement rods extended along the second direction.

12. The tent of claim 11, wherein number of the plurality of reinforcement rods is two, and wherein each of the two reinforcement rods is disposed between adjacent guiding rods, with a same interval to the adjacent guiding rods.

13. The tent of claim 8, wherein the roof frame further comprises a plurality of sliding rods on which the tarpaulin is attached, wherein the plurality of sliding rods are disposed to be extended along the first direction.

14. The tent of claim 13, further comprising a plurality of sliding blocks disposed on the plurality of sliding rods, wherein the guiding rods have a plurality of sliding grooves extended in the second direction, and wherein the plurality of sliding blocks are slidably received in the plurality of sliding grooves.

15. The tent of claim 1, further comprising a plurality of feet attached on lower ends of the plurality of poles.

16. A tent with a retractable roof, comprising:
   a plurality of poles extending substantially perpendicular to the ground, wherein at least one of the plurality of poles comprises an upper pole and a lower pole;
   a roof frame fastened to the plurality of poles and a tarpaulin attached on the roof frame;
   a connection mechanism comprising a connection plate detachably connecting the upper pole and the lower pole;

a sleeve disposed on a lower end of the upper pole, wherein the sleeve is formed in a shape of a tube adapted to slide along the upper pole and the connection mechanism to lock with the connection mechanism;

said sleeve comprising a concave portion recessed inward at a lower end of an inner wall of the sleeve; and a collar mounted on the connection plate of said connection mechanism, wherein the collar comprises a convex portion on an outer wall of the collar adapted to engage with the concave portion of the sleeve.

\* \* \* \* \*